United States Patent
Shintani et al.

(10) Patent No.: US 10,051,331 B1
(45) Date of Patent: Aug. 14, 2018

(54) QUICK ACCESSIBILITY PROFILES

(71) Applicant: Sony Corporation, Tokyo (JP)

(72) Inventors: Peter Shintani, San Diego, CA (US); Brant Candelore, Escondido, CA (US); Mahyar Nejat, San Diego, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/646,986

(22) Filed: Jul. 11, 2017

(51) Int. Cl.
| | |
|---|---|
| *H04N 21/485* | (2011.01) |
| *H04N 21/45* | (2011.01) |
| *H04N 21/422* | (2011.01) |
| *H04N 21/441* | (2011.01) |
| *G10L 13/04* | (2013.01) |
| *H04N 21/4223* | (2011.01) |

(52) U.S. Cl.
CPC ....... *H04N 21/4852* (2013.01); *G10L 13/043* (2013.01); *H04N 21/4223* (2013.01); *H04N 21/42203* (2013.01); *H04N 21/42222* (2013.01); *H04N 21/441* (2013.01); *H04N 21/4532* (2013.01); *H04N 21/4854* (2013.01)

(58) Field of Classification Search
CPC ........... H04N 21/4854; H04N 21/4223; H04N 21/42203; H04N 21/441; H04N 21/42222; H04N 21/4532; H04N 21/4852; G10L 13/043
USPC ....... 348/563, 567, 570, 523, 484, 482, 480, 348/465, 361, 376, 207.11, 231.1, 231.9, 348/247, 158, 647, 706, 714, 716, 719, 348/723, 731, 734, 738, 838; 725/9, 12, 725/38, 46, 52, 109, 152; 455/412.2, 455/456.3, 432.3; 345/169
See application file for complete search history.

(56) References Cited

U.S. PATENT DOCUMENTS

| | | |
|---|---|---|
| 6,195,640 B1 | 2/2001 | Mullaly et al. |
| 7,110,951 B1 | 9/2006 | Pedersen et al. |
| 8,494,298 B2 | 7/2013 | Lewis et al. |
| 8,965,216 B2 | 2/2015 | Oshima et al. |
| 8,965,546 B2 | 2/2015 | Visser et al. |
| 9,055,265 B2 | 6/2015 | Shintani et al. |
| 9,137,484 B2 | 9/2015 | Difrancesco et al. |
| 9,180,053 B2 | 11/2015 | Dalal et al. |
| 9,191,767 B2 | 11/2015 | Hopkins |

(Continued)

FOREIGN PATENT DOCUMENTS

| | | |
|---|---|---|
| EP | 0701366 A2 | 3/1996 |
| JP | 3037041 B2 | 4/2000 |

(Continued)

OTHER PUBLICATIONS

James Ohene-Djan, Rachel Shipsey, "E-Subtitles: Emotional Subtitles as a Technology to assist the Deaf and Hearing-Impaired when Learning from Television and Film.". Goldsmiths College, University of London, 2006, New Cross, London.

(Continued)

*Primary Examiner* — Michael Teitelbaum
(74) *Attorney, Agent, or Firm* — John L. Rogitz

(57) ABSTRACT

An audio video device (AVD) such as a smart TV allows profiles to be defined on the TV. A user accessing the TV can select one of the profiles to have the TV instantly configure itself for the accessing user. This is useful not only for the hearing-impaired but also visually-impaired people, who may encounter difficulty navigating profile setup menus.

18 Claims, 6 Drawing Sheets

(56) References Cited

U.S. PATENT DOCUMENTS

| | | | |
|---|---|---|---|
| 9,257,114 B2 | 2/2016 | Tanaka | |
| 9,263,027 B2 | 2/2016 | Hopkins et al. | |
| 9,596,555 B2 | 3/2017 | Kaburlasos et al. | |
| 2003/0030752 A1* | 2/2003 | Begeja | H04N 7/17318 348/563 |
| 2004/0246272 A1 | 12/2004 | Ramian | |
| 2005/0047624 A1 | 3/2005 | Kleen | |
| 2006/0109242 A1 | 5/2006 | Simpkins | |
| 2006/0125796 A1* | 6/2006 | Utz | G06F 1/1616 345/168 |
| 2006/0140420 A1 | 6/2006 | Machida | |
| 2010/0131983 A1* | 5/2010 | Shannon | H04N 5/44543 725/46 |
| 2011/0035031 A1* | 2/2011 | Faenger | G06Q 30/00 700/94 |
| 2012/0167154 A1* | 6/2012 | Kim | H04N 21/4122 725/109 |
| 2012/0324493 A1* | 12/2012 | Holmdahl | H04H 60/33 725/12 |
| 2013/0121515 A1 | 5/2013 | Hooley et al. | |
| 2013/0133022 A1* | 5/2013 | Bi | H04N 21/4432 725/152 |
| 2014/0196129 A1* | 7/2014 | Amin | H04L 63/08 726/6 |
| 2014/0254828 A1 | 9/2014 | Ray et al. | |
| 2014/0287779 A1* | 9/2014 | O'Keefe | H04W 4/02 455/456.3 |
| 2014/0314261 A1 | 10/2014 | Selig et al. | |
| 2015/0045003 A1* | 2/2015 | Vora | H04M 1/64 455/412.2 |
| 2015/0373295 A1 | 12/2015 | Outters | |
| 2016/0014540 A1 | 1/2016 | Kelly et al. | |
| 2016/0021481 A1 | 1/2016 | Johnson et al. | |
| 2016/0063894 A1 | 3/2016 | Lee | |
| 2016/0078594 A1 | 3/2016 | Scherlen | |
| 2016/0170617 A1 | 6/2016 | Shi et al. | |
| 2016/0239253 A1 | 8/2016 | Staffaroni et al. | |
| 2016/0282624 A1 | 9/2016 | Munger et al. | |
| 2017/0265016 A1 | 9/2017 | Oh et al. | |

FOREIGN PATENT DOCUMENTS

| | | |
|---|---|---|
| JP | 2008236299 A | 10/2008 |
| KR | 100260702 B1 | 7/2000 |

OTHER PUBLICATIONS

Rita Oliveira, Jorge Ferraz De Abreu, Ana Margarida Almeida, "Audio Description in Interactive Television (iTV): proposal of a collaborative and voluntary approach", Department of Communication and Arts, University of Aveiro, Sep. 2016, Aveiro, Portugal.

Anabel Martin Gonzalez, "Advanced Imaging in Head-Mounted Displays for Patients with Age-Related Macular Degeneration", Dissertation, Technical University of Munich, Jun. 29, 2011 (pp. No. 1-149).

Carlos Aguilar, Eric Castet, "Evaluation of a gaze-controlled vision enhancement system for reading in visually impaired people", Nice Sophia Antipolis University, Aix Marseille University, Apr. 5, 2017, Nice, France, Marseille, France.

John L. Sibert, Mehmet Gokturk, Robert A. Lavine, "The Reading Assistant: Eye Gaze Triggered Auditory Prompting for Reading Remediation", George Washington University, 2000.

Kickstarter, "Nura: Headphones that learn and adapt to your unique hearing", launch date May 16, 2016, website: https://www.kickstarter.com/projects/nura/nura-headphones-that-learn-and-adapt-to-your-unique-hearing.

Robert B. Goldstein, Henry Apfelbaum, Gang Luo and Eli Peli "Dynamic Magnification of Video for People with Visual Impairment", May 2003, The Schepens Eye Research Institute, Harvard Medical School, Boston, MA, USA.

Robert Silva, "The ZVOX AV200 AccuVoice TV Speaker Makes Voices and Dialog Clear", Dec. 20, 2016 https://www.lifewire.com/the-zvox-av200-accuvoice-tv-speaker-makes-voices-and-dialog-clear-4086538?utm_source=emailshare&utm_medium=social&utm_campaign=shareurlbuttons.

Gregory Carlsson, Steven Richman, James R. Milne, "Accessibility for the Hearing Impaired Using Measurement and Object Based Audio", file history of related U.S. Appl. No. 15/590,795, filed May 9, 2017.

Brant Candelore, Mahyar Nejat, Peter Shintani, "Modifying Display Region for People with Vision Impairment", file history of related U.S. Appl. No. 15/631,669, filed Jun. 23, 2017.

Brant Candelore, Mahyar Nejat, Peter Shintani, "Modifying Display Region for People with Loss of Peripheral Vision", file history of related U.S. Appl. No. 15/645,617, filed Jul. 10, 2017.

Brant Candelore, Mahyar Nejat, Peter Shintani, "Modifying Display Region for People with Macular Degeneration", file history of related U.S. Appl. No. 15/645,796, filed Jul. 10, 2017.

Peter Shintani, Brant Candelore, Mahyar Nejat, "Sensing Viewer Direction of Viewing to Invoke Accessibility Menu in Audio Video Device", file history of related U.S. Appl. No. 15/646,661, filed Jul. 11, 2017.

Peter Shintani, Brant Candelore, Mahyar Nejat, "Moving Audio from Center Speaker to Peripheral Speaker of Display Device for Macular Degeneration Accessibility", file history of related U.S. Appl. No. 15/646,550, filed Jul. 11, 2017.

Peter Shintani, Brant Candelore, Mahyar Nejat, "Moving Audio from Center Speaker to Peripheral Speaker of Display Device for Macular Degeneration Accessibility", related U.S. Appl. No. 15/646,550, Non-Final Office Action dated Feb. 9, 2018.

Peter Shintani, Brant Candelore, Mahyar Nejat, "Moving Audio from Center Speaker to Peripheral Speaker of Display Device for Macular Degeneration Accessibility", related U.S. Appl. No. 15/646,550, Applicant's response to Non-Final Office Action filed Feb. 14, 2018.

Peter Shintani, Brant Candelore, Mahyar Nejat, "Moving Audio from Center Speaker to Peripheral Speaker of Display Device for Macular Degeneration Accessibility", related U.S. Appl. No. 15/646,550, Final Office Action dated Jan. 25, 2018.

Peter Shintani, Brant Candelore, Mahyar Nejat, "Moving Audio from Center Speaker to Peripheral Speaker of Display Device for Macular Degeneration Accessibility", related U.S. Appl. No. 15/646,550, Applicant's response to Final Office Action filed Jan. 26, 2018.

* cited by examiner

QUICK ACCESSIBILITY PROFILES

FIELD

The present application relates to technically inventive, non-routine solutions that are necessarily rooted in computer technology and that produce concrete technical improvements.

BACKGROUND

Menus for vision- and hearing-impaired accessibility to audio video displays often are "buried" under multiple layers of higher order user interface menus. This makes accessing such menus to adjust impairment features of the display especially difficult for those with visual impairments. Thus, navigating set-up menus can be a problem for the hearing and visually impaired. Menu screens are often buried and not intuitive.

SUMMARY

Present principles additionally recognize that multiple users, some with visual or hearing impairments and some without, might share an audio video device (AVD) in a common space. Description herein provides for set-up of profiles to make switching user-based settings on the AVD much simpler.

In an aspect, an article of manufacture (AOM) includes a computer storage that is not a transitory signal and that in turn includes instructions executable by a processor to receive an image and/or vocal sound from a first user. The instructions are executable to, based on the image and/or vocal sound, correlate the first user to a first profile associated with one or more accessibility settings of an audio video device (AVD), and to automatically configure the AVD with the accessibility settings of the first profile.

In some examples, the instructions are executable to determine whether the first user is present with no other users. The instructions are executable to, responsive to determining the first user is present with no other users, configure the AVD with the accessibility settings of the first profile, but responsive to determining the first user is present with at least a second user, determine whether the first user has priority over the second user. Further, in example embodiments the instructions are executable to, responsive to determining the first user has priority over the second user, configure the AVD with the accessibility settings of the first profile, and responsive to determining the second user has priority over the first user, configure the AVD with the accessibility settings of the second profile.

In non-limiting implementations determining whether the first user has priority over the second user is based at least in part on a priority setting in the first profile. Determining whether the first user has priority over the second user may alternatively or additionally be based at least in part on a priority setting in the second profile.

In another aspect, an audio video device (AVD) includes a processor, a speaker to present demanded audio under control of the processor, and a video display to present demanded video under control of the processor. Storage contains instructions executable by the processor to receive a reference of a first person. The reference includes an image of the first person and/or voice recording of the first person. The instructions are executable to associate the reference with a profile of accessibility settings of the AVD tailored to the first person, and subsequently to receive an image and/or voice signal matching the reference. The instructions are further executable to determine whether people other than the first person are indicated by the image and/or voice signal, and responsive to determining that no people other than the first person are indicated by the image and/or voice signal, automatically establish, on the AVD, the accessibility settings defined in the profile associated with the first person. On the other hand, the instructions are executable to, responsive to determining that at least one second person other than the first person is indicated by the image and/or voice signal, determine which of the first or second person has priority over the other, and responsive to determining that the first person has priority over the second person, automatically establish, on the AVD, the accessibility settings defined in the profile associated with the first person. Responsive to determining that the first person does not have priority over the second person, the instructions are executable to not automatically establish, on the AVD, the accessibility settings defined in the profile associated with the first person.

In another aspect, a method includes receiving an image and/or vocal sound from a first user. The method also includes determining whether the image and/or sound matches a reference, and responsive to the image and/or sound matching the reference, correlating the first user to a first profile associated with one or more accessibility settings of an audio video device (AVD). The method further includes, responsive to the image and/or sound matching the reference, automatically configuring the AVD with the accessibility settings of the first profile.

The details of the present disclosure, both as to its structure and operation, can be best understood in reference to the accompanying drawings, in which like reference numerals refer to like parts, and in which:

BRIEF DESCRIPTION OF THE DRAWINGS

FIGS. 2A and 2B are plan views of alternate accessibility keys;

DETAILED DESCRIPTION

Figure 1:
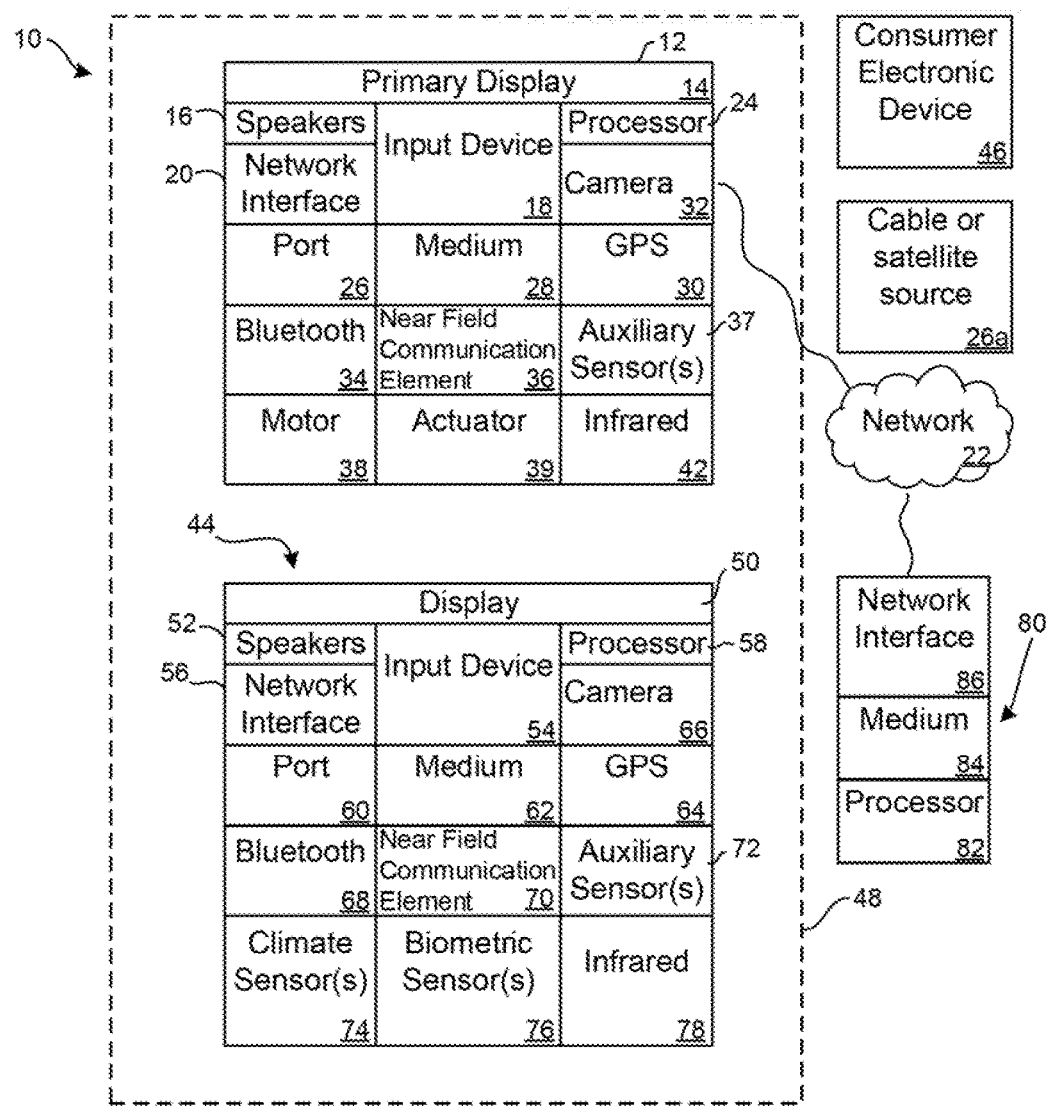
FIG. 1 is a block diagram of an example system including an example in consistent with present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or "8K" (or higher resolution) flat screen and that may be touch-enabled for receiving consumer input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a USB port to physically connect (e.g. using a wired connection) to another CE device and/or a headphone port to connect headphones to the AVDD 12 for presentation of audio from the AVDD 12 to a consumer through the headphones. The AVDD 12 may further include one or more computer memories 28 that are not transitory signals, such as disk-based or solid state storage (including but not limited to flash memory). Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., in a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a wireless telephone. The second CE device 46 may implement a portable hand-held remote control (RC).

The first CE device 44 may include one or more displays 50 that may be touch-enabled for receiving consumer input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 may control the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a USB port to physically connect (e.g. using a wired connection) to another CE device and/or a headphone port to connect headphones to the first CE device 44 for presentation of audio from the first CE device 44 to a consumer through the headphones. The first CE device 44 may further include one or more computer memories 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command, etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 78 such as an IR data association (IRDA) device. A battery (not shown) may be provided for powering the first CE device 44.

The second CE device 46 may include some or all of the components shown for the CE device 44.

Now in reference to the afore-mentioned at least one server 80, it includes at least one server processor 82, at least one computer memory 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

Figure 2:
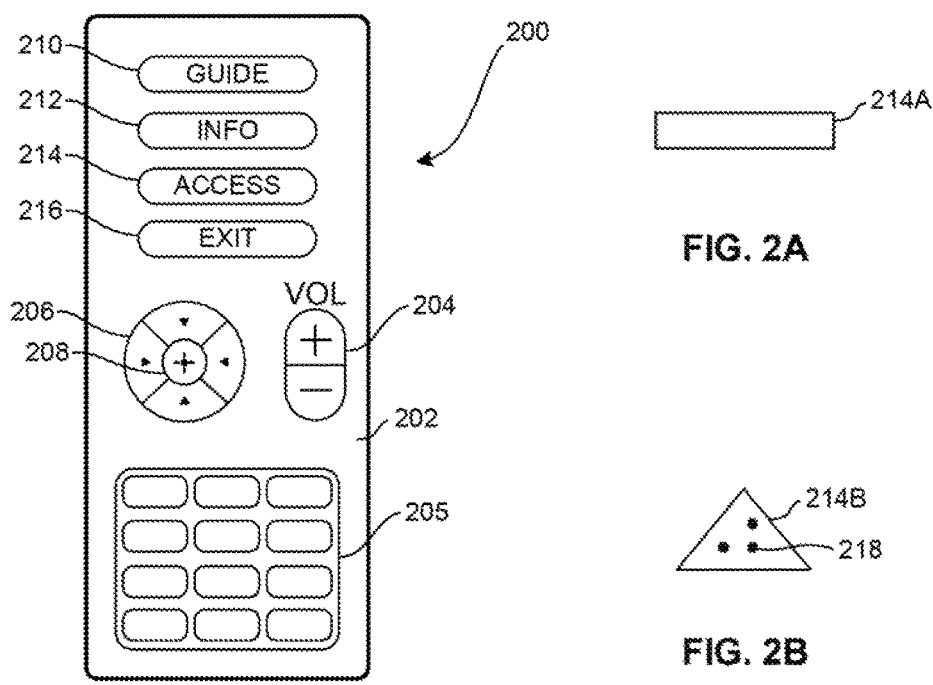
FIG. 2 is a plan view of an example remote control (RC) consistent with present principles.

FIG. 2 shows a remote control (RC) 200 that may include appropriate components of the above-described CE device 44. Thus, the RC 200 may include one or more internal processors, computer memories, and wireless transmitters such as IR command transmitters to control a device such as the AVDD 12.

As shown, the RC 200 includes a typically plastic, hand-holdable housing 202 with multiple input keys that can be manipulated by a person to cause wireless commands to be sent from the RC 200 to, e.g., the AVDD 12. For example, volume up and down keys 204 may be manipulated to respectively turn the volume of the speakers of the AVDD 12 up and down. An alpha-numeric keypad 205 may be provided on the RC 200 for inputting letters and/or numbers to the AVDD 12. Also, a directional rocker 206 may be provided with each arm of the rocker being manipulable to move a screen cursor up and down and left and right. If desired, a select key 208 may be located in the center of the rocker 206 for input of a "select" command.

Further, in the example shown the RC 200 may include a guide key 210 manipulable to send a command to present an electronic program guide (EPG) on the AVDD 12. Also, an info key 212 may be provided and can be manipulated to send a command to present information related to a selected program on the AVDD 12/An exit key 216 also may be provided to command the AVDD to exit, e.g., the EPG or info page.

According to present principles, an accessibility key (AK) 214 is included on the RC 200. In the example shown, the AK 214 is larger than the other keys on the RC, and has the same shape (oval) as the other keys. In other embodiments, the AK may have a different shape than the other keys on the RC 200. For example, an AK 214A may be rectilinear-shaped as shown in FIG. 2A or triangular-shaped as shown in FIG. 2B or other unique shape such as circular, compared to the other keys on the RC. If desired, a braille code 218 can be provided on the AK for further tactile identification of the AK by a person such as a vision-impaired person.

Circuitry such as one or more of the above-described processors/DSPs etc. may be provided in the RC 200 and may be configured to receive a signal generated from an interaction with the AK, such as a press of the AK, finger hover above the AK, etc. Responsive to the interaction with the AK, the RC 200 may send a command to the AVDD 12 to present a user interface (UI) such as the UI 300 shown in FIG. 3. In addition or alternatively, responsive to the interaction with the AK, the RC 200 may send a command to the AVDD 12 to actuate a text to speech function, sometimes referred to as a "talk back" function of the AVDD 12. By "talk back" function is meant audible feedback played on one or more speakers of the AVDD 12 in response to user input such as queries or commands, including audio corresponding to visual UI features.

Figure 3:
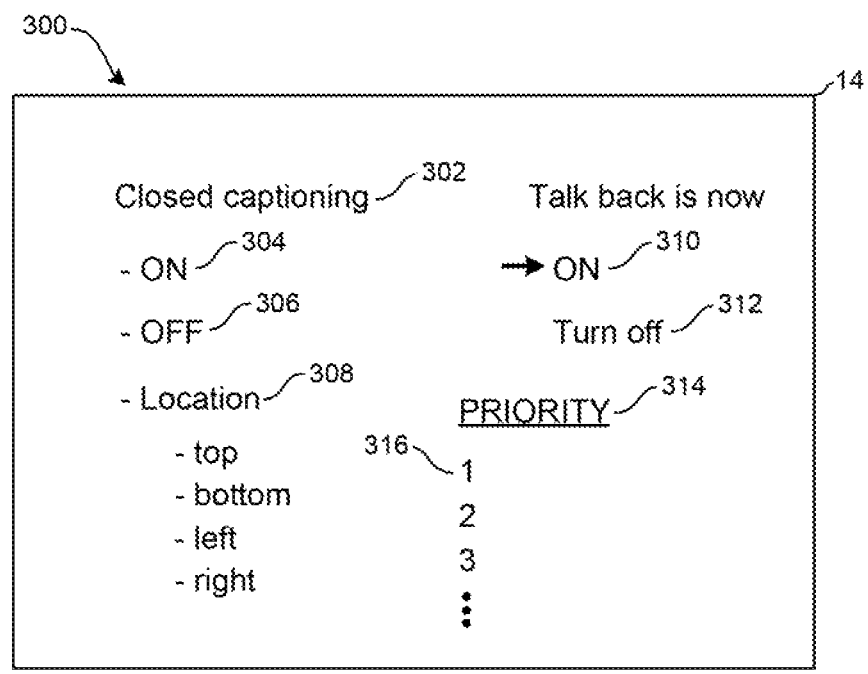
FIG. 3 is a screen shot of an example user interface (UI) consistent with present principles.

As shown in FIG. 3, the UI 300 may include closed captioning options 302 selectable by means of moving a screen cursor using, e.g., the RC 200. An on selector 304 may be selected to turn closed captioning on, meaning closed captioning will be presented on the AVDD 12, while an off selector 306 may be selected to turn off closed captioning.

When closed captioning is selected to be on, a list 308 of locations for the closed captioning may be provided to enable a user to select where the closed captioning will be presented on the display, e.g., at the top, or bottom, or left or right side of the display. The list 308 may be presented on the speakers of the AVDD 12 according to the talk back function.

Returning to the talk back function, as shown by the capitalized "on" message 310 talk back has been automatically enabled responsive to manipulating the AK 214. An off selector 312 may be selected to turn off the talk back function.

In some examples, a priority 314 for the person associated with the profile may be set. One or more priority level selectors 316 may be presented and one of them selected to define the priority of the person, e.g., with "1" indicating highest, "2" indicating next high, and so on.

Figure 4:
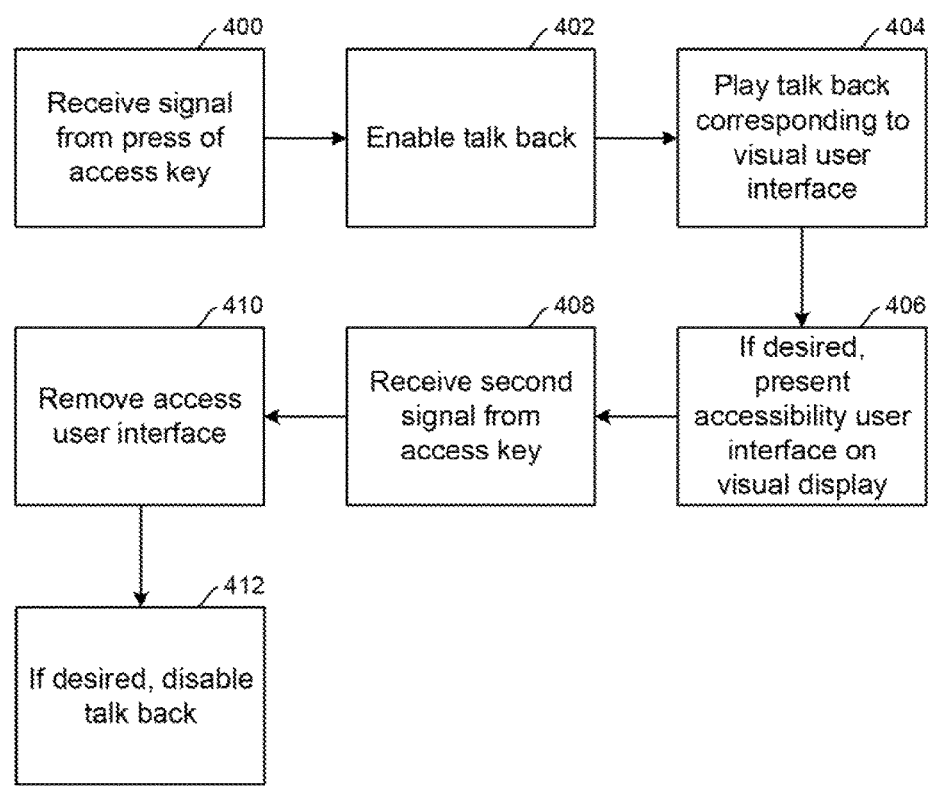
FIG. 4 is a flow chart of example logic consistent with present principles.

FIG. 4 illustrates logic consistent with FIGS. 2 and 3. At block 400 a signal is received by the circuitry in the RC 200 from an interaction with the AK 214. In response, talk back is enabled at block 402, so that audio corresponding, e.g., to the visible UI 300 may be played at block 404.

If desired, at block 406 an accessibility UI such as the example UI 300 may be presented on the AVDD 12 to enable establishing one or more accessibility options, including talk back and closed captioning preferences. When it is desired to remove the UI 300 from view, the user can press the AK 214 a second time, which is received at block 408 to cause the AVDD 12 to remove the accessibility UI at block 410. Talk may also be disabled if desired at block 412 responsive to toggling the AK 214.

Figure 5:
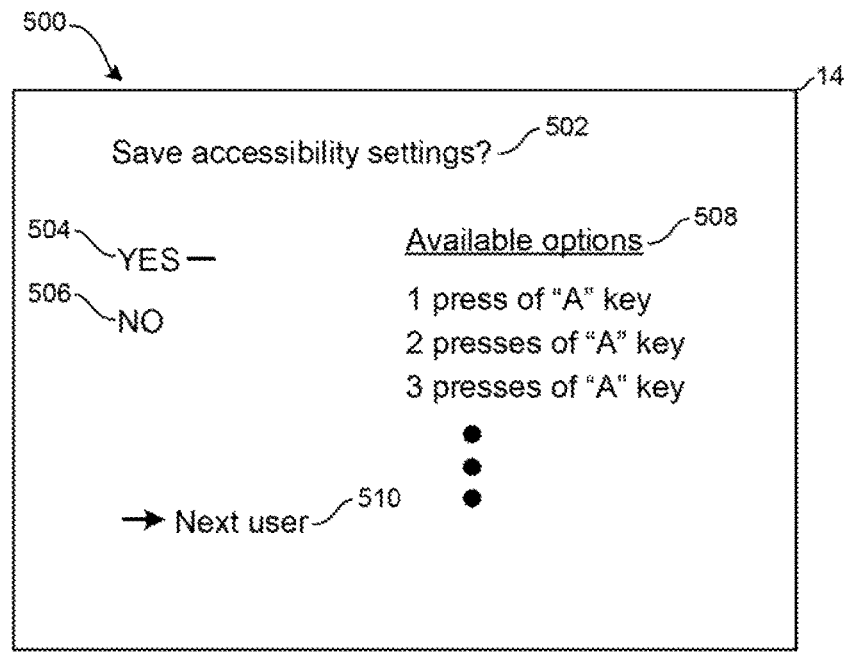
FIG. 5 is a screen shot of an example UI for establishing user access setting profiles.
Figure 6:
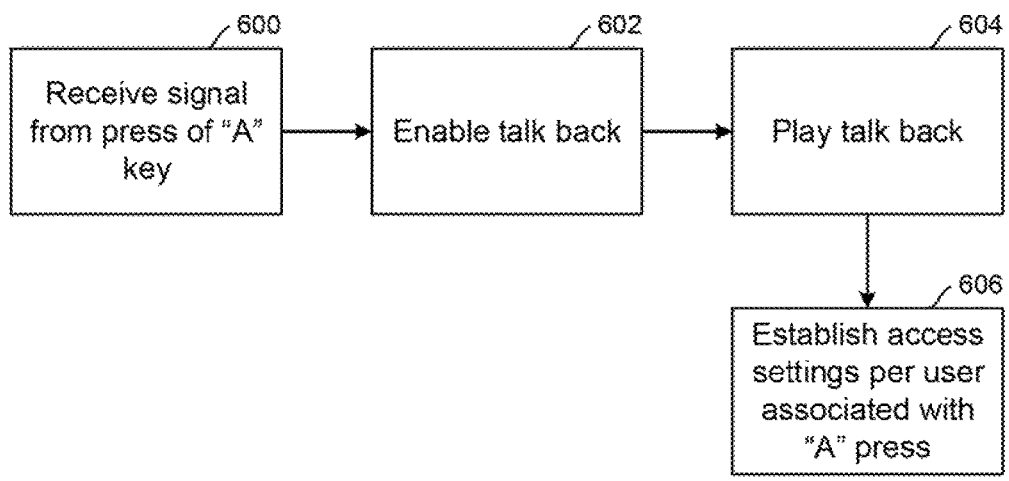
FIG. 6 is a flow chart of example logic consistent with FIG. 5.

In addition to the above-discussed functionality of the AK 214, FIGS. 5 and 6 illustrate alternative or additional functionality that may be provided by the AK. FIG. 5 illustrates a UI 500 that may be invoked on the AVDD 12 by any appropriate means that prompts a user to save accessibility settings as may have been established using the UI 300 of FIG. 3. A user can select a yes selector 504 to save the settings and a no selector 506 to not save the settings.

Additionally, a list 508 may be presented of setting establishment enablement options. More particularly, by selecting a type of press of the AK 214 from the list 508, a user can correlate future presses of the selected type with the saved accessibility settings, which are automatically established in the AVDD 12 when future AK manipulations of the selected type are effected. For example, as shown the user can select to correlate his personal settings with one, two, or three (in quick succession) presses of the AK. Additional press type options may include a press and hold, two presses and holds, etc. A next user selector 510 may then be selected to enable another user to establish a different set of accessibility settings, including no special accessibility settings at all.

FIG. 6 shows that at block 600 a signal from a press of the AK 214 may be received by the AVDD, which in response may automatically enable the above-described talk back function at block 602. Any prompts or other UI features of the AVDD may be presented audibly at block 604 using the talk feature. As described above, the user's accessibility settings are automatically established on the AVDD at block 606 responsive to the press of the AK 214.

Thus, multiple users can correlate respective AK press types with respective accessibility settings. For instance, an impaired user may establish accessibility settings such as presenting closed captioning automatically simply by manipulating the AK according to the type of manipulation associated with the impaired user's settings. When the impaired user is absent, a non-impaired person may then establish his or her accessibility settings, including the removal of all special accessibility options if so set, automatically by manipulating the AK according to the non-impaired user's type of manipulation. In this way, accessibility settings can be easily and automatically changed by users according to their preference simply by manipulating a single top level key (the AK 214) on the RC 200.

Figure 7:
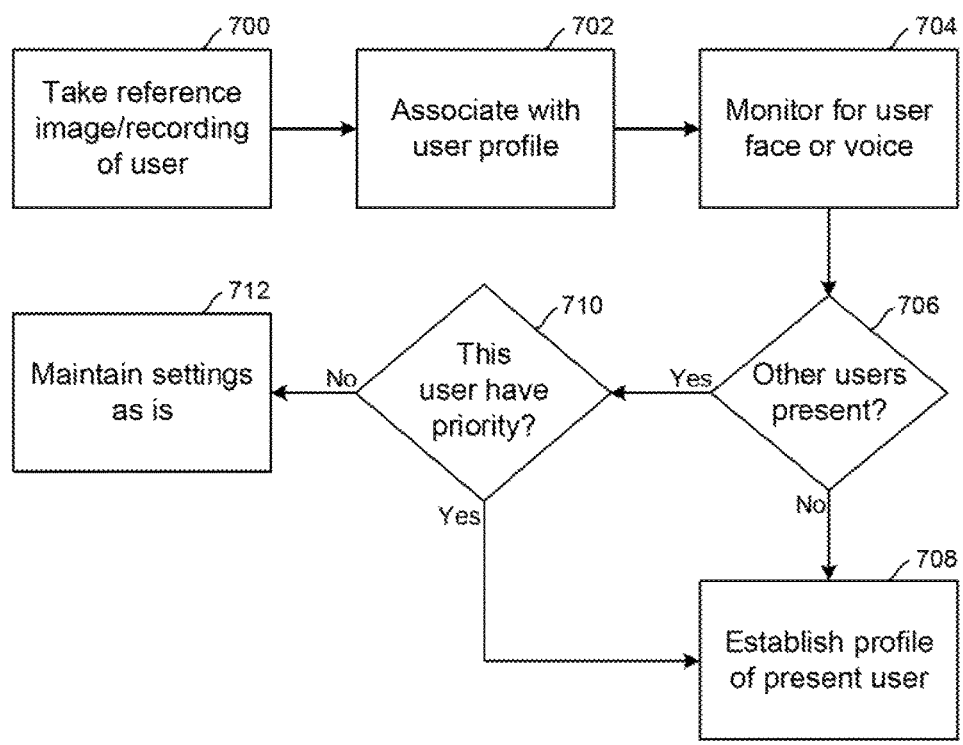
FIG. 7 is a flow chart consistent with present principles.

FIG. 7 illustrates additional functionality which essentially replaces the need to press the AK 214 above with simply imaging a person's face or voice to accomplish the same easy and convenient establishment of accessibility settings on a display device for the particular user, who may be vision- or hearing-impaired or otherwise find navigation through accessibility menus difficult. At block 700 a reference image and/or voice print is taken of a user ("first user" for clarity) using, e.g., the camera and/or microphone on the AVDD described above. This reference is associated with the settings profile of the first user at block 702 using, e.g., a setup menu that may be operated on behalf of the first user by another person.

Subsequently, the display device can monitor, at block 704, for detections of the first user as indicated by face recognition performed on images from camera or voice recognition performed on voice signals from the microphone. Assuming such a detection is made and matched with the reference obtained at block 700, the logic can proceed to decision diamond 706 to determine whether additional people are present with the first user. If not, the display settings associated with the profile of the first user are established at block 708.

However, if more than the first user is present, the other people may be imaged and compared to reference images to determine if the other people match reference for profiles, and if so, the logic may move to decision diamond 710 to determine, e.g., based on the priority settings of the respective users described above in reference to FIG. 3, which user has priority. If the first user has priority, the display settings associated with the profile of the first user are established at block 708. However, if the first user does not have priority, the display settings associated with the profile of the first user are not established and if desired the settings of the display device may change to the settings associated with the other recognized user having priority or at least may remain unchanged at block 712.

Note that in some embodiments, if a random key press of, e.g., more than a threshold time or more than a threshold number of presses greater than one is detected (indicating that although the key can be any key, it was pressed deliberately), the AVD can automatically turn on, if it is off, and automatically initiate the talk back (text to speech) function. Priority for the accessibility key may be to activate the text to speech function first, and if already activated when the accessibility key is selected, activate an accessibility menu for adjusting, e.g., closed captioning, text size, etc.

A user can select "user" and may be one of several users. The user's accessibility profile may be stored locally and/or in the cloud (meaning on the Internet) with the profile defining configuring devices being watched by the user such as the AVD and/or configuring the audio and/or video to be louder for example (when audio) for a hearing-impaired user or text to be larger for a vision-impaired user, etc.

While particular techniques are herein shown and described in detail, it is to be understood that the subject matter which is encompassed by the present application is limited only by the claims.

What is claimed is:

1. An article of manufacture (AOM) comprising:
   at least one computer storage that is not a transitory signal and that comprises instructions executable by at least one processor to:
   receive an image and/or vocal sound from a first user;
   based on the image and/or vocal sound, correlate the first user to a first profile associated with one or more accessibility settings of an audio video device (AVD);
   automatically configure the AVD with the accessibility settings of the first profile;
   determine whether the first user is present with no other users;
   responsive to determining the first user is present with no other users, configure the AVD with the accessibility settings of the first profile;
   responsive to determining the first user is present with at least a second user, determine whether the first user has priority over the second user;
   responsive to determining the first user has priority over the second user, configure the AVD with the accessibility settings of the first profile; and
   responsive to determining the second user has priority over the first user, configure the AVD with the accessibility settings of the second profile.

2. The AOM of claim 1, wherein the determine whether the first user has priority over the second user is based at least in part on a priority setting in the first profile.

3. The AOM of claim 2, wherein the determine whether the first user has priority over the second user is based at least in part on a priority setting in the second profile.

4. The AOM of claim 1, wherein the instructions are executable to:
   responsive to receiving a signal representing manipulation of any key on a controller, automatically energize the AVD if the AVD is off and automatically present a text to speech function on the AVD.

5. The AOM of claim 1, wherein the instructions are executable to:
   responsive to receiving a signal from a controller, determine whether a text to speech function is instantiated on the AVD;
   responsive to determining that the text to speech function is not instantiated, instantiate the text to speech function;
   responsive to determining that the text to speech function is instantiated, activate an accessibility menu on the AVD responsive to receiving the signal from a controller.

6. The AOM of claim 1, wherein the first profile is stored locally to the AVD.

7. The AOM of claim 1, wherein the first profile is stored on the Internet and is accessible to the AVD.

8. The AOM of claim 1, wherein the first profile defines configuring the AVD and/or configuring audio and/or video received at the AVD for the first user.

9. An audio video device (AVD) comprising;
at least one processor;
at least one speaker to present demanded audio under control of the at least one processor;
at least one video display to present demanded video under control of the at least one processor; and
at least one storage with instructions executable by the at least one processor to:
receive a reference of a first person, the reference comprising an image of the first person and/or voice recording of the first person;
associate the reference with a profile of accessibility settings of the AVD tailored to the first person;
receive an image and/or voice signal matching the reference;
determine whether people other than the first person are indicated by the image and/or voice signal,
responsive to determining that no people other than the first person are indicated by the image and/or voice signal, automatically establish, on the AVD, the accessibility settings defined in the profile associated with the first person;
responsive to determining that at least one second person other than the first person is indicated by the image and/or voice signal, determine which of the first or second person has priority over the other;
responsive to determining that the first person has priority over the second person, automatically establish, on the AVD, the accessibility settings defined in the profile associated with the first person; and
responsive to determining that the first person does not have priority over the second person, not automatically establish, on the AVD, the accessibility settings defined in the profile associated with the first person.

10. The AVD of claim 9, wherein the instructions are executable to:
responsive to determining that the first person does not have priority over the second person, not change any accessibility settings of the AVD.

11. The AVD of claim 10, wherein the instructions are executable to:
responsive to determining that the first person does not have priority over the second person, establish settings of the AVD according to a profile associated with the second person.

12. The AVD of claim 10, wherein the determine which of the first or second person has priority over the other is based at least in part on a priority setting in the first person's profile.

13. The AVD of claim 10, wherein the instructions are executable to:
responsive to receiving a signal representing manipulation of any key on a controller, automatically energize the AVD if the AVD is off and automatically present a text to speech function on the AVD.

14. The AVD of claim 10, wherein the instructions are executable to:
responsive to receiving a signal from a controller, determine whether a text to speech function is instantiated on the AVD;
responsive to determining that the text to speech function is not instantiated, instantiate the text to speech function;
responsive to determining that the text to speech function is instantiated, activate an accessibility menu on the AVD responsive to receiving the signal from a controller.

15. A method comprising:
receiving an image and/or vocal sound from a first user;
determining whether the image and/or sound matches a reference;
responsive to the image and/or sound matching the reference, correlating the first user to a first profile associated with one or more accessibility settings of an audio video device (AVD);
responsive to the image and/or sound matching the reference, automatically configuring the AVD with the accessibility settings of the first profile;
determining whether the first user is present with no other users;
responsive to determining the first user is present with no other users, configuring the AVD with the accessibility settings of the first profile;
responsive to determining the first user is present with at least a second user, determining whether the first user has priority over the second user;
responsive to determining the first user has priority over the second user, configuring the AVD with the accessibility settings of the first profile; and
responsive to determining the second user has priority over the first user, configuring the AVD with the accessibility settings of the second profile.

16. The method of claim 5, wherein determining whether the first user has priority over the second user is based at least in part on a priority setting in the first profile.

17. The method of claim 16, wherein determining whether the first user has priority over the second user is based at least in part on a priority setting in the second profile.

18. The method of claim 5, wherein determining whether the first user has priority over the second user is based at least in part on a priority setting in the second profile.

* * * * *